(12) United States Patent
Le

(10) Patent No.: US 9,264,257 B2
(45) Date of Patent: Feb. 16, 2016

(54) DYNAMIC TERNARY CONTENT-ADDRESSABLE MEMORY CARVING

(71) Applicant: CISCO TECHNOLOGY, INC., San Jose, CA (US)

(72) Inventor: Chau Minh Le, Hayward, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 14/276,318

(22) Filed: May 13, 2014

(65) Prior Publication Data
US 2015/0333929 A1    Nov. 19, 2015

(51) Int. Cl.
*G06F 12/00*    (2006.01)
*H04L 12/54*    (2013.01)
*G06F 17/30*    (2006.01)
*H04L 12/741*    (2013.01)
*H04L 12/743*    (2013.01)

(52) U.S. Cl.
CPC ...... *H04L 12/5689* (2013.01); *G06F 17/30982* (2013.01); *H04L 45/745* (2013.01); *H04L 45/7457* (2013.01)

(58) Field of Classification Search
CPC .............. H04L 45/745; H04L 45/7457; H04L 12/5689; G06F 17/30982
See application file for complete search history.

(56) References Cited

U.S. PATENT DOCUMENTS 9,043,448 B1 * 5/2015 Ng .................. G06F 15/177
709/220

OTHER PUBLICATIONS

Cisco Systems, Inc., Cisco Nexus 6000 Series NX-OS Security Configuration Guide, Release 6.x, Jan. 29, 2013, pp. 217-223.*
Cisco Systems, Inc., "Cisco Nexus 6000 Series NX-OS Security Configuration Guide, Release 6.x," First Published Jan. 29, 2013, Last Modified Jul. 29, 2013, Text Part No. OL-27933-04; 9 pages.

* cited by examiner

*Primary Examiner* — Shawn X Gu
(74) *Attorney, Agent, or Firm* — Patent Capital Group

(57) ABSTRACT

Example embodiments of the present disclosure describe mechanisms for dynamic carving (i.e., applying a revised template for ternary content addressable memory (TCAM) in a network switch while the TCAM remains operational). The TCAM comprises a plurality of TCAM allocation units (TAUs) and entries of data in the TCAM corresponding to forwarding modes are arranged according to an original template mapping each forwarding mode to a subset of TAU(s). An important characteristic of such methods and systems is the ability to avoid rebooting the network switch. The mechanisms include a "compression" step involving relocating entries of data in the TCAM according to an intermediate template, wherein the intermediate template comprises at least one unallocated TAU(s) for accommodating the revised template. Furthermore, the mechanisms include, a "decompression" step (after the "compression" step), involving relocating the entries of data in the TCAM according to the revised template.

20 Claims, 10 Drawing Sheets

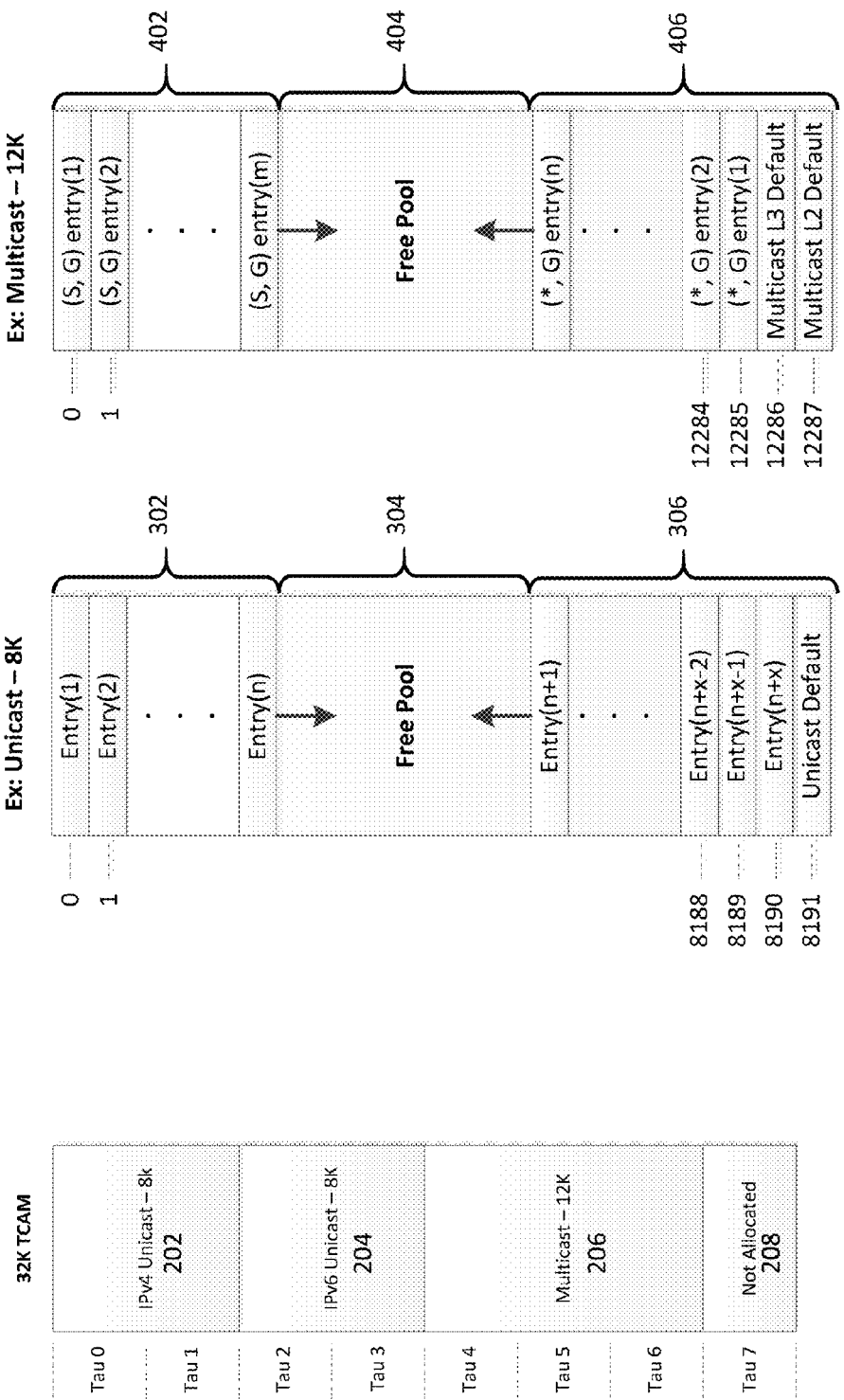

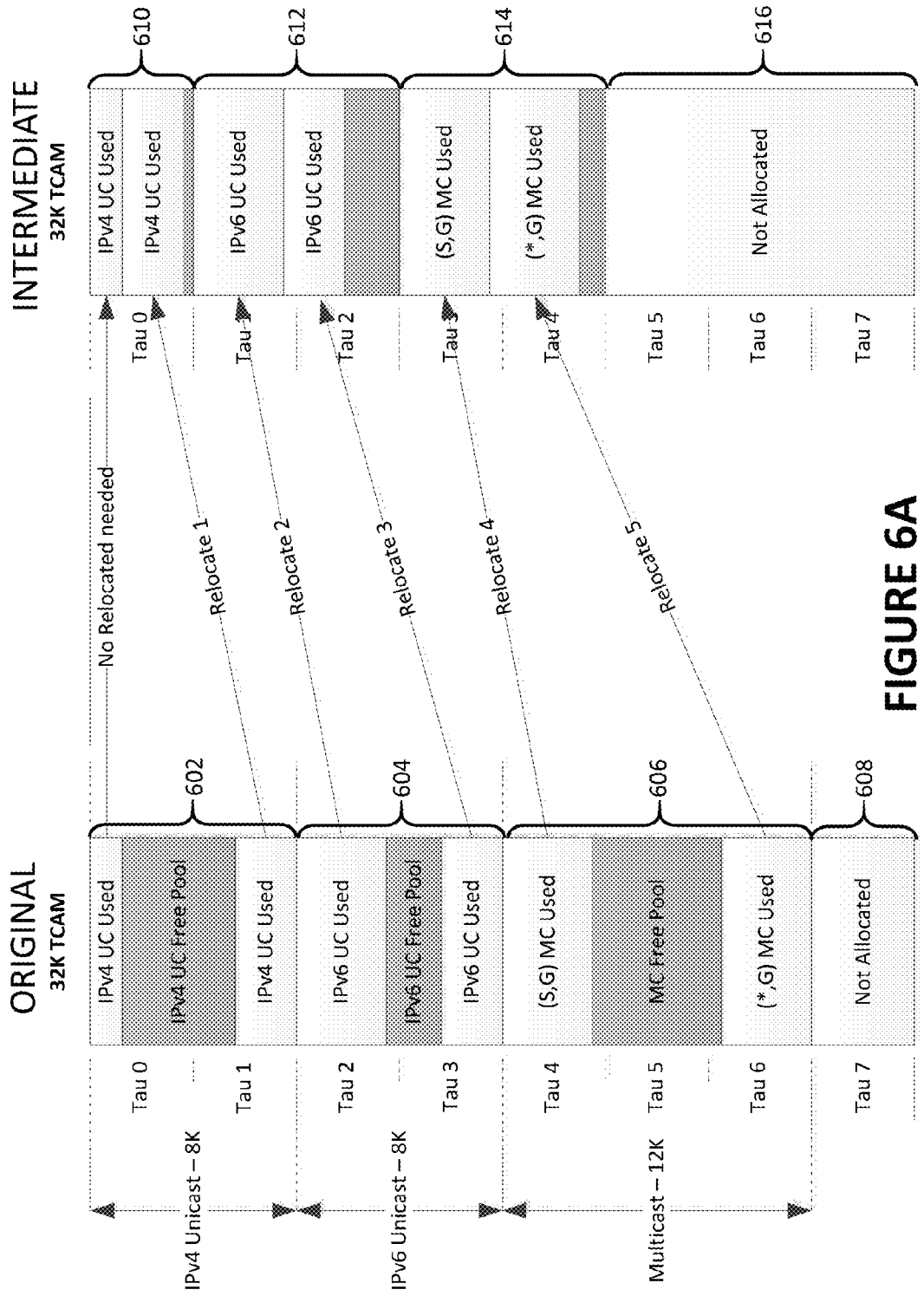

DYNAMIC TERNARY CONTENT-ADDRESSABLE MEMORY CARVING

TECHNICAL FIELD

This disclosure relates in general to the field of computer systems and, more particularly, to dynamic carving of ternary content-addressable memory.

BACKGROUND

The world today enjoys a wide variety of services provided over the network. These services range from browsing websites, streaming broadcast content, downloading media content, cloud storage of media, real-time communications, stock trading, big data computing, etc. These services are typically provided by computer systems and networking components which interconnect the computer systems. The networking components serve an important role of transporting data from one device to another device quickly, reliably, and efficiently.

One kind of networking component is a network switch. A network switch serves as a controller, enabling networked devices to talk to each other efficiently. While some small-scale switches are used to provide connectivity between devices in an office or a home, some high-performance switches are used in scenarios where information is to be exchanged at very high speeds. In one example, high-frequency financial trading often demand high network-access speed to accelerate critical functions such as market data delivery, price discovery, and best-trade execution. Latency demanded by high-frequency trading can be as low as 190 nanoseconds. Designing and operating such high performance network switches is not a trivial task, and often, these high performance network switches require sophisticated hardware to support such low latency requirements.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is an illustration of a TCAM and an exemplary template, according to some embodiments of the disclosure;

FIG. 3 shows an illustrative forwarding mode, according to some embodiments of the disclosure;

FIG. 4 shows another illustrative forwarding mode, according to some embodiments of the disclosure;

FIGS. 6A-B show an illustrative TCAM according to an original template, an intermediate template, and a revised template, according to some embodiments of the disclosure;

DETAILED DESCRIPTION OF EXAMPLE EMBODIMENTS

Overview

The present disclosure describes mechanisms for dynamic carving, i.e., applying a revised template for ternary content addressable memory (TCAM) in a network switch while the TCAM remains operational. The TCAM comprises a plurality of TCAM allocation units (TAUs) and entries of data in the TCAM corresponding to forwarding modes are arranged according to an original template mapping each forwarding mode to a subset of TAU(s). An important characteristic of such methods and systems is the ability to avoid rebooting the network switch. The mechanisms include a "compression" step involving relocating entries of data in the TCAM according to an intermediate template, wherein the intermediate template comprises at least one unallocated TAU(s), e.g., for accommodating the revised template. Furthermore, the mechanisms include, a "decompression" step (after the "compression" step), involving relocating the entries of data in the TCAM according to the revised template.

EXAMPLE EMBODIMENTS

Basics of Network Switches

Figure 1:
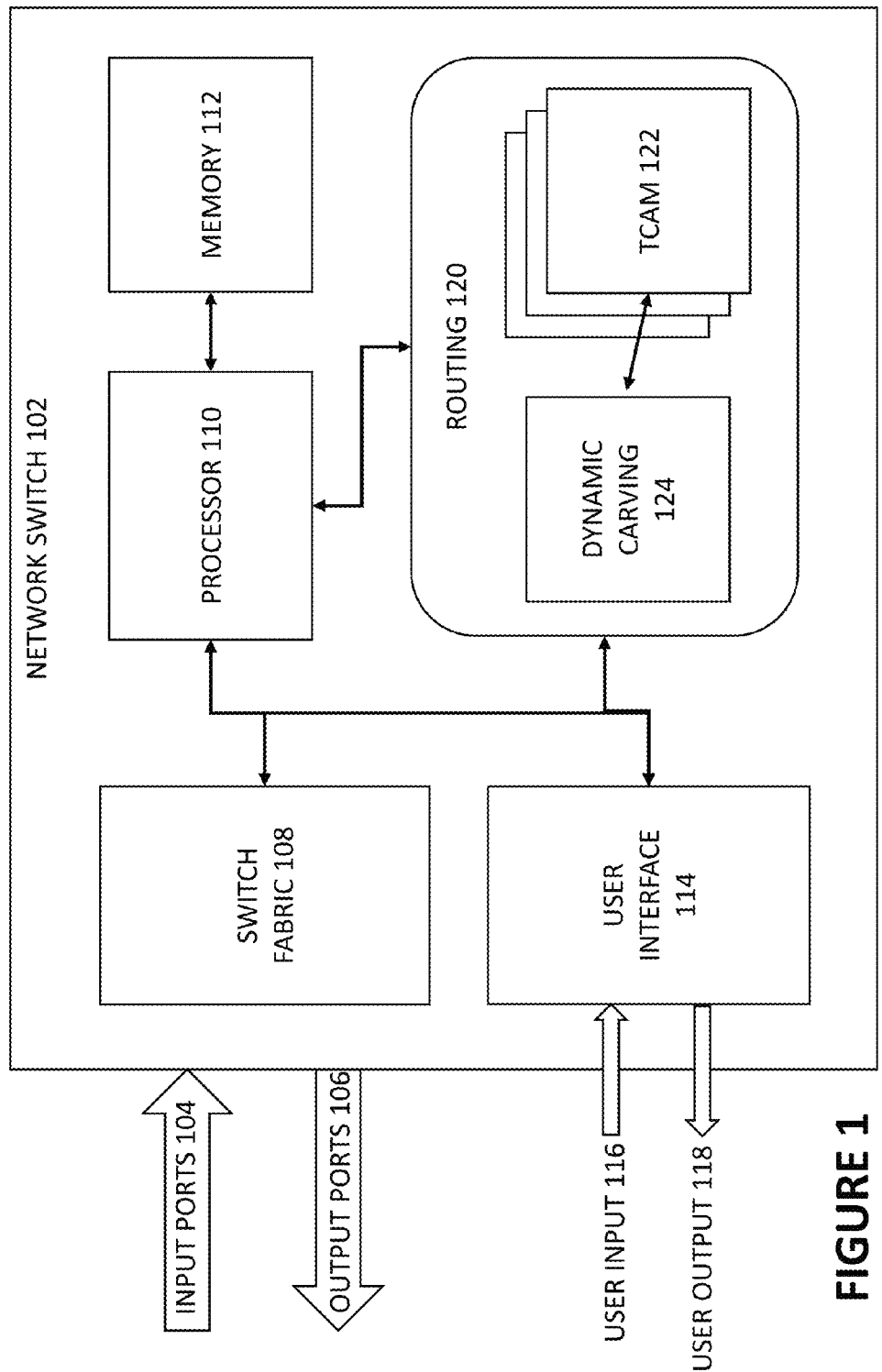
FIG. 1 is a system diagram of an exemplary network switch, according to some embodiments of the disclosure.

Network switches are placed between devices to route traffic (i.e., network traffic comprising network packets), and cables are used to connect the devices to input ports and output ports of the network switch. Network switches, in general, serve to control and forward network packets from one port to one or more appropriate ports. FIG. 1 is a system diagram of an exemplary network switch, according to some embodiments of the disclosure. A network switch 102 has one or more of input ports 104 and one or more of output ports 106 (in some cases a single physical port can be used for both input and output). Networked devices are communicably connected to these input ports 104 and output ports 106.

Typically, circuitry is provided in a switch fabric 108 that can route packets between input ports 104 and output ports 106. A processor 110 can be provided to control the switch fabric 108 to enforce how the packets should be routed. A memory 112 (one or more non-transitory computer-readable media) can be provided to store or buffer packets, and/or instructions which the processor can execute to carry out processes of the network switch 102.

A user interface module 114 can implement a user interface and allow a network administrator (or any suitable user) to provide user input 116 to, e.g., configure the network switch 102, or to query the status of the network switch 102. The user interface module 114 can provide user output 118 to, e.g., report status of the network switch 102, via a computer user interface. The user interface module 114 may interact with the user over a network where the user is able to configure or query the network switch remotely, or the user interface module 114 may interact with the user locally where the user is physically next to the network switch via a terminal or operator console connected to the network switch 102.

One important part of network switch 102 is routing module 120. Routing module 120 can support processor 110 in enforcing how network packets should be routed in the switch fabric 108. Functions of routing module 120 can include: learning routes and paths between networked devices, filtering network packets according to certain filtering criteria, forwarding network packet according to one or more rules, interfacing between different layers of the Open Systems Interconnection (OSI) model, and enforcing network policies or any suitable parameters to the network traffic. In one example, routing module 120 can include routing tables for storing routes to different network destinations according to the topology of the network around the network switch. In one example, the routing table provides information to the processor 110 and switch fabric 108 on where and/or how packets should be routed.

Understanding Ternary Content-Addressable Memory (TCAM) in High Performance Network Switches Routing tables support one or more lookup functions based on attributes of a network packet, the results from the look up affects where and how the network packet should be routed. These lookup functions are thus essential to the operation of the network switch 102.

Multilayer switches, the high-grade type of switches, can forward frames and packets at wire speed by using hardware circuitry (e.g., Application Specific Integrated Circuits (ASICs) in processor 110). Specific OSI Layer 2 (data link layer) and OSI Layer 3 (network layer) components, such as routing tables or Access Control Lists (ACLs), can be cached into hardware. Routing, switching, ACL and Quality of Service (QoS) tables are stored in a high-speed table memory so that forwarding decisions and restrictions can be made in high-speed hardware. Switches perform lookups in these tables for result information, such as to determine whether a packet with a specific destination IP address is supposed to be dropped according to an ACL.

To provide low latency routing, the routing module 120 of FIG. 1 may often include a special type of memory architecture to support these memory tables, called ternary content-addressable memory (TCAM). Shown in FIG. 1, routing module 120 includes one or more TCAMs 122. Unlike standard computer memory (random access memory or RAM) in which the processor provides a memory address and the RAM returns the data word stored at that address, a TCAM can receive a query (e.g., a data word) from a processor, and TCAM would search through the whole memory to see if the query is stored in the memory. Then, TCAM can return one or more storage addresses at which the query is stored in the memory, and/or other data associated with the query. TCAM is capable of matching three states and returning three results (hence "ternary" in its name). Specifically, TCAM can match "0", "1" or "wildcard" (any value), and return "0", "1", or "don't care". TCAM not only can search the whole memory in a single clock cycle, TCAM is particularly useful for storing routing tables in network switches allowing for very fast lookups (far superior to traditional RAM). For instance, TCAM is useful for building tables for searching on longest matches such as Internet Protocol (IP) routing tables organized by IP prefixes (utilizing the "wildcard" state as a mask), and the table can further store ACL, QoS, and other information generally associated with upper-layer processing. TCAM is built using sophisticated hardware circuitry, and thus, can be very costly, and are more often used in high-grade network switches.

TCAM memory in advanced network switches can store a searchable network address whenever a switch learn the address from network traffic or the switch is provisioned with a certain topology. As a switch continues to forward the traffic and discover more network devices, more address entries are added to the TCAM memory (into a region corresponding to the forwarding mode of interest).

Templates for Arranging Entries of Data in TCAM

Typically, a TCAM in a network switch is segmented to provide a plurality of forwarding modes (or forwarding categories). The TCAM is portioned or divided up into regions dedicated to each of the forwarding modes. The forwarding modes can provide different functionalities (i.e., serves to provide lookup functionality based on different types of query data, and/or programmed to provide enforce different policies and/or to provide different results). The TCAM has a plurality of TCAM allocation units (TAUs) as part of its architecture. To enforce the boundaries of these regions, a TCAM on a network switch is configured with a template, typically when the network switch boots up. The template maps each of the forwarding modes to a subset TAUs in the TCAM (i.e., forwarding modes are mapped to non-overlapping, contiguous regions defined by those subsets of TAUs).

FIG. 2 is an illustration of a TCAM and an exemplary template, according to some embodiments of the disclosure. For purposes of illustration, FIG. 2 shows a 32K TCAM (can hold 32768 entries of data) having 8 TAUs. Other sizes of TCAMs are envisioned by the present disclosure. In this example, each TAU has a capacity to hold 4096 entries. Other capacities of TAUs are envisioned by the present disclosure.

As an illustration, the original template on this 32K TCAM has three forwarding modes, which provides lookup functions for IPv4 Unicast, IPv6 Unicast, and Multicast (other forwarding modes/categories are envisioned by the present disclosure). In this original template, a first forwarding mode, IPv4 Unicast, is mapped to TAU 0 and TAU 1 (having 8K usable entries, shown as region 202). A second forwarding mode, IPv6 Unicast, is mapped to TAU 2 and TAU 3 (having 8K usable entries, shown as region 204). A third forwarding mode, Multicast, is mapped to TAU 4, TAU 5, and TAU 6 (having 12K usable entries, shown as region 206). TAU 7 is not allocated to any forwarding mode (shown as region 208).

When carving (allocating or reserving) space for each network forwarding mode such as IPv4, IPv6, and Multicast (of Low Latency Cache Mode or Normal Forwarding Mode, etc.), the space must be carved in a multiple number of TAU in-order for the processor (e.g., an ASIC) in the network switch to operate on TCAM memory. Generally speaking, the TCAM having N TAUs can have up to N forwarding modes. A valid template would use N or less number of TAUs.

FIG. 3 shows an illustrative forwarding mode (i.e., mapped to a region of a TCAM), according to some embodiments of the disclosure. In each region (corresponding to a forwarding mode), such as the one shown in FIG. 3, there are data structures and pointers to keep track of its free pool portion, first (top) used pool, and second (bottom) used pool, as entries are added and removed from TCAM. In this FIGURE, the Unicast forwarding mode having 8192 (usable) entries is schematically illustrated. While this example (and the example shown in FIG. 4) is described in relation to Unicast and Multicast forwarding modes, the arrangement scheme of the entries of data are can be applicable for other forwarding modes as well.

For this forwarding mode shown in FIG. 3, i.e., Unicast, the region set by the corresponding TAUs mapped for this forwarding mode has a first used portion 302 (sometimes referred to as the top used portion or the upper used portion), a second used portion 306 (sometimes referred to as the bottom used portion or the lower used portion). Furthermore, the region includes a free pool portion 304 arranged between the first used portion 302 and the second used portion 306. New entries are inserted to the region (e.g., region 204 of FIG. 2, having TAU 2 and TAU 3) in the free pool portion 304 as the TCAM learns the new entries. As more entries of data are inserted into the region, the size of the free pool portion 304 (naturally) becomes smaller. Pointers can be used to maintain and mark the boundaries between the different portions.

FIG. 4 shows another illustrative forwarding mode, according to some embodiments of the disclosure. In this example, the Multicast forwarding mode having 12288 (usable) entries is schematically illustrated. In a similar fashion (although holding different kinds of entries of data), this forwarding mode, i.e., Multicast, the region set by the corresponding TAUs mapped for this forwarding mode has a first used portion 402 (sometimes referred to as the top used portion), a second used portion 406 (sometimes referred to as the bottom used portion). Furthermore, the region includes a free pool portion 404 arranged between the first used portion 402 and the second used portion 406. New entries are inserted to the region (e.g., region 206 of FIG. 2, having TAU 4, TAU 5, and TAU 6) in the free pool portion 404 as the TCAM learns the new entries. As more entries of data are inserted into the region, the size of the free pool portion 404 (naturally) becomes smaller. Pointers can be used to maintain and mark the boundaries between the different portions.

TCAM Carving

For network switches that are configurable by the network administrator, i.e., the user, the template defined for the TCAM can be revised by the user. For the purposes of this disclosure, the template prior to the revision is referred to herein as "the original template"; the new template to be applied to the TCAM is referred to herein as "the revised template". In conventional switches where the configuration of TCAM forwarding modes to TAU mappings can be changed, a user can provide user input to select pre-defined templates to apply as the revised template, or define a revised template to commit to the network switch. The process of reconfiguring the template (i.e., mapping of forwarding modes to TAU(s)) is referred to herein as TCAM carving (i.e., the process of carving regions of the TCAM to be mapped to forwarding modes). In some cases, a computer system can also provide input to select pre-defined templates or to define a revised template (when an algorithm determines that a revised template is desired or needed).

The ability to revise the template for TCAM provides tremendous flexibility to the user and the overall system, and enables the user/system to change how the TCAM should be allocated based on current conditions and/or network topology. However, conventional network switches providing such a capability requires a reboot of the network switch before the revised template can take effect. This can cause a downtime of 5 minutes or more where the network switch is out of commission. The downtime can cause significant disruptions to time-critical applications, and/or cause network administrators to take extra redundancy measures to compensate for such downtime.

Improved Approach to TCAM Carving: Dynamic TCAM Carving

A method for implementing dynamic TCAM carving is disclosed, and such method involves relocating entries of data individually from the original template to the revised template without having to reset or reboot the network switch. This method can be performed or implemented by dynamic carving module 124 in routing module 120 in FIG. 1. Within the context of this disclosure, the phrase "dynamic TCAM carving" means that the method can dynamically apply a revised template to the TCAM without requiring a network switch reboot. This method enables a network switch (in many cases, commanded by a user) to change the amount of allocated space (i.e., the TAUs) for each forwarding mode/category without requiring a switch reboot and maintain optimal traffic forwarding during and after the carving operation. Preventing a reboot session would save an enterprise network down time of 1 to 5 minutes. Beside down time, the network switch also has the benefit to continue with optional traffic forwarding without having to re-learn the network addresses and topology.

As discussed in relation to FIG. 2, depending on the forwarding mode (in some cases the modes are defined by the type of address such as IPv4, IPv6, Multicast, etc.), there are reserved regions in TCAM for each type of forwarding mode/categories. When a user or a system realize a need to, e.g., (1) increase the reserved TCAM memory region for one or more categories, (2) reduce the unused reserved space of one or more categories, or (3) change the set of forwarding categories, a dynamic TCAM carving method could be triggered.

Prior to having dynamic TCAM carving, the switch has to be rebooted in-order for a revised template to take effect. With dynamic TCAM carving, the contents stored in TCAM memory are said to be "compressed" or "squeezed" into (equal or) less number of TAUs. Specifically, entries of data are moved from one location of TCAM memory to another such way that each forwarding mode uses less (or least) number of TAU (TCAM Allocation Unit) space while still maintaining TCAM content in an operational state. In cases where entries of data are not moved, the dynamic carving module ensures that the entries of data are using the least number of TAU space while still TCAM content in an operational state.

When all categories are "compressed" (not in a data compression sense where the data is no longer usable without decompression), the TCAM would have sufficient continuous available space in TCAM memory to "de-compress", "spread", or "expand" each forwarding mode or add new forwarding modes to match a revised template as needed. During and after the dynamic carving session, all entries in TCAM memory remain accessible by the system, the processor (e.g., the ASIC in the network switch), and data path.

Figure 5:
FIG. 5 shows an illustrative flow diagram of an exemplary method for applying a revised template for TCAM in a network switch, according to some embodiments of the disclosure.

FIG. 5 shows an illustrative flow diagram of an exemplary method for applying a revised template for TCAM in a network switch, according to some embodiments of the disclosure. The TCAM, as described herein, includes a plurality of TAUs, and entries of the TCAM corresponding to forwarding modes are (initially) arranged according to an original template mapping each forwarding mode to a subset of TAUs.

In box 502, a dynamic carving module can relocate entries of data in the TCAM (from the original template) according to an intermediate template. This first relocation of entries of data corresponds to "squeezing" the regions to an intermediate template, which could in some cases use less number of TAUs. Generally speaking, the first relocation of entries implements an intermediate template, which would include at least one unallocated TAU(s). The at least one unallocated TAU(s) can in some cases be used for accommodating the revised template. In some cases, the at least one unallocated TAU(s) resulting from the "compression" provides the space needed for relocating entries from the intermediate template to the revised template (e.g., where the number of TAU(s) for a forwarding mode is increased in the revised template when compared against the original template). In some cases, the at least one unallocated TAU(s) resulting from the "compression" provides the space needed for adding one or more (new) forwarding modes in the revised template.

Figure 6B:
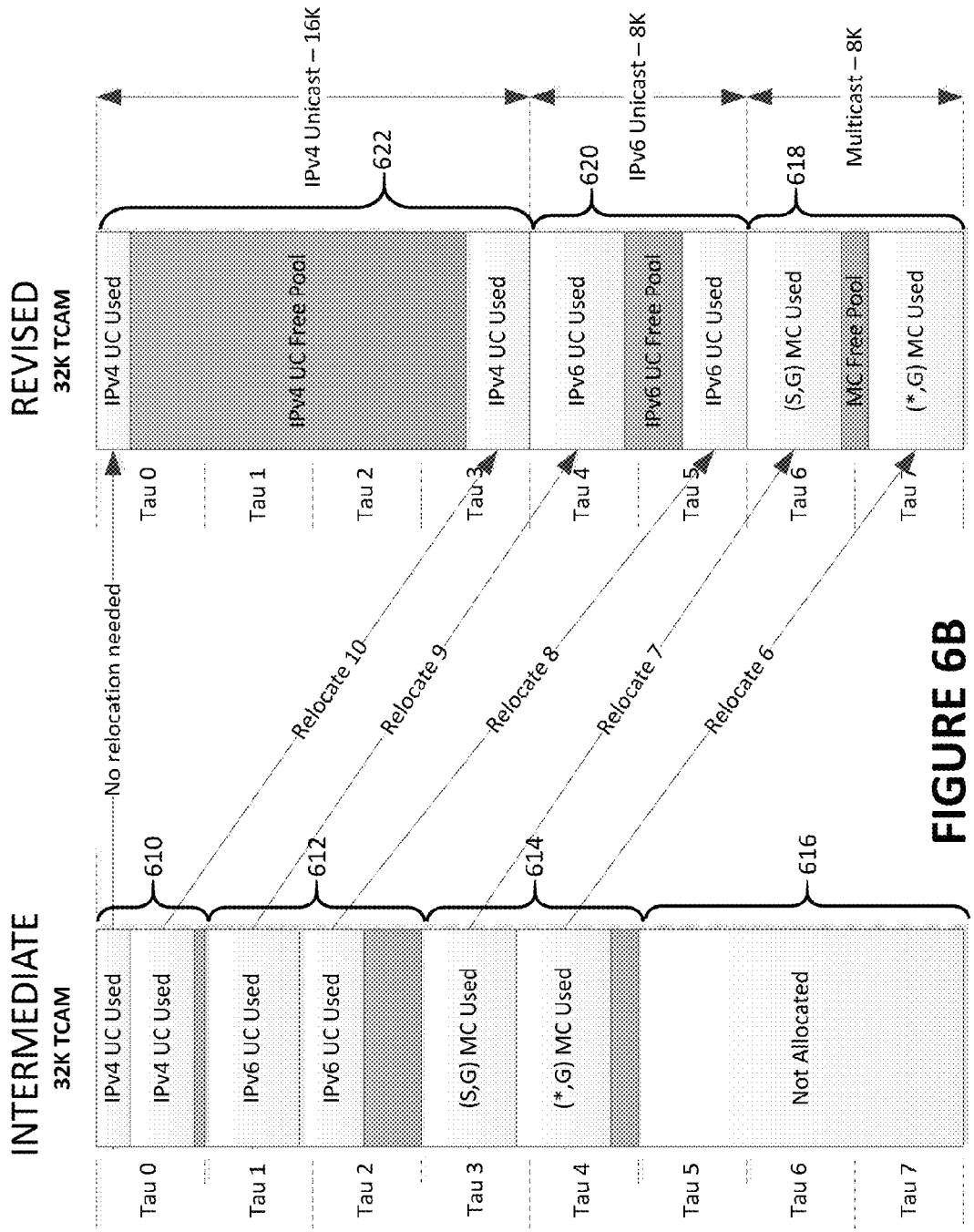

An example of the first relocation of entries of data is illustrated in FIG. 6A. In box 504, after the entries of data are relocated according to the intermediate template, the dynamic carving module can relocate the entries of data in the TCAM (from the intermediate template) according to the revised template. In some cases, the "decompression" would cause the second relocation (of box 504) to utilize the at least one unallocated TAUs of the intermediate template (e.g., if one of the forwarding modes is to be expanded, or one or more forwarding modes are to be added). In other words, this second relocation of entries of data can correspond to "expanding" one or more regions of the intermediate template to the (ultimate) revised template selected or provided by the user, or the second relocation of entries could correspond to adding one or more regions to implement the revised template. An example of the second relocation of entries of data is illustrated in FIG. 6B.

Advantageously, with this approach, the relocating of the entries of data according to the intermediate template and the relocating of the entries of data according to the revised template are performed without rebooting the network switch. Furthermore, the relocating of the entries of data according to the intermediate template and the relocating of the entries of data according to the revised template are performed while the entries of data in the TCAM remain accessible by circuitry external to the TCAM.

During dynamic carving, the method "compresses" each region corresponding to the forwarding modes by reducing the number of TAU used (if possible). Entries are rearranged closer together to fit in least number of TAU as possible. One possible mechanism for fitting the used portions for a forwarding mode includes determining a minimum number of TAUs required by the first used portion and the second used portion for each of the forwarding modes, and providing the intermediate template by mapping the minimum number of TAUs from the determining step to each of the forwarding modes. The free pool portion of each forwarding mode can be reduced to fit the padding space of partially unused TAU. In the intermediate template, address entries still remain in one or more location in TCAM memory to enable access by data path. When all forwarding modes are "compressed", there would be sufficient continuous available space (if needed), i.e., one or more unallocated TAU(s) in the intermediate template, to "decompress" or "expand" the forwarding modes or add new forwarding modes to meet a new configuration, i.e., to accommodate the revised template.

"Compression" or "Squeezing" the Forwarding Modes

FIG. 6A shows an illustrative TCAM according to an original template (on the left), an intermediate template (on the right), and the first relocation of entries of data from the original template to the intermediate template, according to some embodiments of the disclosure. In this example, the TCAM is arranged according to the template shown in FIG. 2 (referred to in this example as "the original template"). Specifically, in this original template, a first forwarding mode, IPv4 Unicast, is mapped to TAU 0 and TAU 1 (having 8K usable entries, shown as region 602). A second forwarding mode, IPv6 Unicast, is mapped to TAU 2 and TAU 3 (having 8K usable entries, shown as region 604). A third forwarding mode, Multicast, is mapped to TAU 4, TAU 5, and TAU 6 (having 12K usable entries, shown as region 606). TAU 7 is not allocated to any forwarding mode (shown as region 608).

Suppose a user wishes to change the configuration of the TCAM to use a revised template such that IPv4 Unicast is mapped to 4 TAUs having 16K usable entries, IPv6 Unicast is mapped to 2 TAUs having 8K usable entries, and Multicast to 2 TAUs having 8K usable entries. In this example, the set of forwarding modes did not change between the original template and the revised template. However, the number of allocated TAUs for the IPv4 Unicast is increased, and the number of allocated TAUs for the Multicast has decreased. Furthermore, every TAU is mapped to a forwarding mode in the revised template (whereas the original template has one unallocated TAU).

When "compressing" the forwarding categories, the method reduces the number of TAUs used for each forwarding category (if possible) while still maintaining TCAM entries in an operational state. In some cases, a number of TAUs mapped to at least one of the forwarding modes in the intermediate template is less than a number of TAUs mapped to the at least one of the forwarding modes in the original template as a result of the compression. In other words, for the at least one of the forwarding modes with which the number of TAUs is reduced in the intermediate template (i.e., there is sufficient space in the free pool portion in the original template to squeeze the used portions into less number of TAUs), the dynamic carving module would rearrange entries of data for the at least one forwarding mode to reduce the size of the free pool portion in the TCAM in the intermediate template. This in turn would increase the bottom unallocated portion of TCAM after all the forwarding modes have been "compressed" in the intermediate template.

The region 602 having entries of data for IPv4 Unicast, is compressed to using only 1 TAU in the intermediate template (shown as region 610) because the top used portion and the bottom used portion for IPv4 Unicast can fit within 1 TAU (i.e., TAU 0). The dynamic carving module may compute such a compression based on the size of the top used portion and the bottom used portion (or the size of the free pool portion) for IPv4 Unicast to see what is the minimum integer multiple of TAUs needed to fit the used portions.

In this example, the top used portion of IPv4 Unicast is not relocated, however the bottom used portion is relocated from TAU 1 to TAU 0, right after the top used portion (indicated by the arrow labeled "Relocate 1"). The free pool portion (whose size is reduced in the intermediate template when compared to the free pool portion in the original template) then follows the bottom used portion. For this illustration, the free pool portion for IPv4, when the entries of data is arranged according to the intermediate template, is placed at an end of a region 610, after the first used portion and right after the second used portion. (The region 610 is set by the TAU(s) mapped to the particular forwarding mode in the intermediate template.)

The region 604 having entries of data for IPv6 Unicast, cannot be compressed to use less number of TAUs due to the insufficient room in the free pool portion to reduce the free pool as an integer multiple of TAU. Thus, the region 612 in the intermediate template corresponding to IPv6 Unicast still occupies two TAUs (TAU1 and TAU 2). However, the overall TCAM is compressed by moving the forwarding mode upwards in the TCAM, i.e., the top used portion of IPv6 Unicast is relocated from TAU 2 to TAU 1 (indicated by the arrow labeled "Relocate 2"), and the bottom used portion of IPv6 Unicast is relocated to a location right after the top used portion straddling both TAU 1 and TAU 2 (indicated by the arrow labeled "Relocate 3"). The IPv6 forwarding category now occupies region 612, with the free pool portion following the bottom used portion in the intermediate template in TAU 2.

The region 606 having entries of data for Multicast, can be compressed because the free pool portion is large enough (equal or larger than a TAU), or in other words, the used portions can be fit in a smaller integer multiple of TAUs. In the original template, Multicast occupies 3 TAUs, and in the intermediate template, Multicast occupies only 2 TAUs (corresponding to region 614). The free pool portion in the intermediate template for Multicast is effectively reduced when compared to the free pool portion in the original template. In this illustration, the top used portion in the original template is relocated to TAU 3 in the intermediate template (indicated by the arrow labeled "Relocate 4") and the bottom used portion in the original template is relocated after the top used portion in the intermediate template (indicated by the arrow labeled "Relocate 5").

The intermediate template now has an unallocated region 616 (comprising at least one unallocated TAU(s)) for accommodating the revised template, if needed. In other words, the intermediate template has an unallocated and contiguous region 616 of one or more TAUs to allow, if needed, the relocation of the entries of data according to the revised template.

FIG. 6B shows an illustrative TCAM according to the intermediate template (on the left side), a revised template (on the right side), and the second relocation of entries of data from the intermediate template to the revised template, according to some embodiments of the disclosure. Specifically, this illustration shows the result of "decompressing" the TCAM when the forwarding modes are expanded to meet the revised template, i.e., to occupy the amount of reserved space as intended by the revised template.

To "expand" the regions in the TCAM, the method tackles region 614 first (the first region from the bottom up besides the unallocated region 616). Furthermore, the method moves the bottom used portion of the region before moving the top used portion of the region. Utilizing the unallocated TAU(s) of the intermediate template, the bottom used portion of region 614 in the intermediate template is relocated to TAU 7 (indicated by arrow labeled "Relocate 6") at the bottom end of the region 618 in the revised template, and the top used portion of region 614 in the intermediate template is relocated to TAU 6 (indicated by arrow labeled "Relocate 7") at the top end of region 618 in the revised template. This second relocation enforces the free pool portion in the revised template to be located between the top used portion and the bottom used portion in region 618 of the revised template.

Then, the method tackles region 612. The bottom used portion of region 612 in the intermediate template is relocated to TAU 5 (indicated by arrow labeled "Relocate 8") at the bottom end of the region 620 in the revised template, and the top used portion of region 612 in the intermediate template is relocated to TAU 4 (indicated by arrow labeled "Relocate 9") at the top end of region 620 in the revised template. Again, this relocation enforces the free pool portion in the revised template to be located between the top used portion and the bottom used portion in region 620 of the revised template.

Then, the method tackles region 610. The bottom used portion of region 610 in the intermediate template is relocated to TAU 3 (indicated by arrow labeled "Relocate 10") at the bottom end of the region 622 in the revised template, and the top used portion of region 612 in the intermediate template is not relocated, and stays at the top end of region 622 in the revised template. Again, this relocation enforces the free pool portion in the revised template to be located between the top used portion and the bottom used portion in region 622 of the revised template.

Dynamic carving without rebooting the network switch is complete after the relocations shown in FIGS. 6A-B. The result allows TCAM memory to be re-divided dynamically without rebooting the system by compressing TCAM reserved space to have a sufficient continuous/contiguous region of unused space (e.g., region 616) to migrate TCAM memory dividing regions to new set of regions set by the revised template. At any state of re-dividing TCAM memory, the TCAM content still continue to be accessible by data path. Preventing a reboot session would save an enterprise network down time of 1 to 5 minutes. Besides avoiding down time, the switch also has the benefit to continue with optional traffic forwarding without having to re-learn the network addresses and topology. This dynamic carving method works for an original template including a first set of forwarding modes and a revised template including of a second set of forwarding modes different from the first set of forwarding modes. Furthermore, this dynamic carving method works when a revised template differs from an original template where a number of TAUs mapped to at least one of the forwarding modes is different between the revised template and the original template.

Detailed Implementation of Relocating Entries of Data

During compressing and decompressing processes, TCAM entries are still accessible by the processor (e.g., the ASIC) and data path. To rearrange a top used portion and a bottom used portion, the method would move the entries in the portions one entry at a time (or in some cases, a small number of entries at a time if the moves can perform in parallel). In the most basic sense, the method would copy the entry to a new location then delete the entry at the old location. This mechanism makes sure that at any point at least one copy of the entry is retained on TCAM memory in order for the data path to continue its normal operation.

In other words, relocating the entries of data in the TCAM according to the intermediate template and relocating the entries of data in the TCAM according to the revised template comprises relocating a particular entry of data, among the entries of data, from a first location in the TCAM to a second location in the TCAM (entry by entry relocation). In particular, relocating the particular entry of data includes: copying the particular entry of data stored at the first location to the second location; after the particular entry of data is copied to the second location, deleting the particular entry of data at the first location.

FIGS. 7A-D show an illustrative TCAM in different states as entries of data are relocated in the TCAM, according to some embodiments of the disclosure. The illustration shows the entries of data of IPv6 Unicast forwarding mode had just finished being compressed, and the method is about to compress entries of data in the Multicast forwarding mode. Each of the views in the FIGURES show a snapshot of the state of TCAM while the method compresses entries in the Multicast forwarding mode.

The example shown illustrates that a top used portion in Multicast forwarding mode (or in any used portion) can include entry A, entry B, entry C, and entry D. These figures illustrate how some of these entries are relocated to a new location from the original template to the intermediate template (however, the same copy and delete mechanism applies to relocating used portions from the intermediate template to the revised template).

Figure 7A:
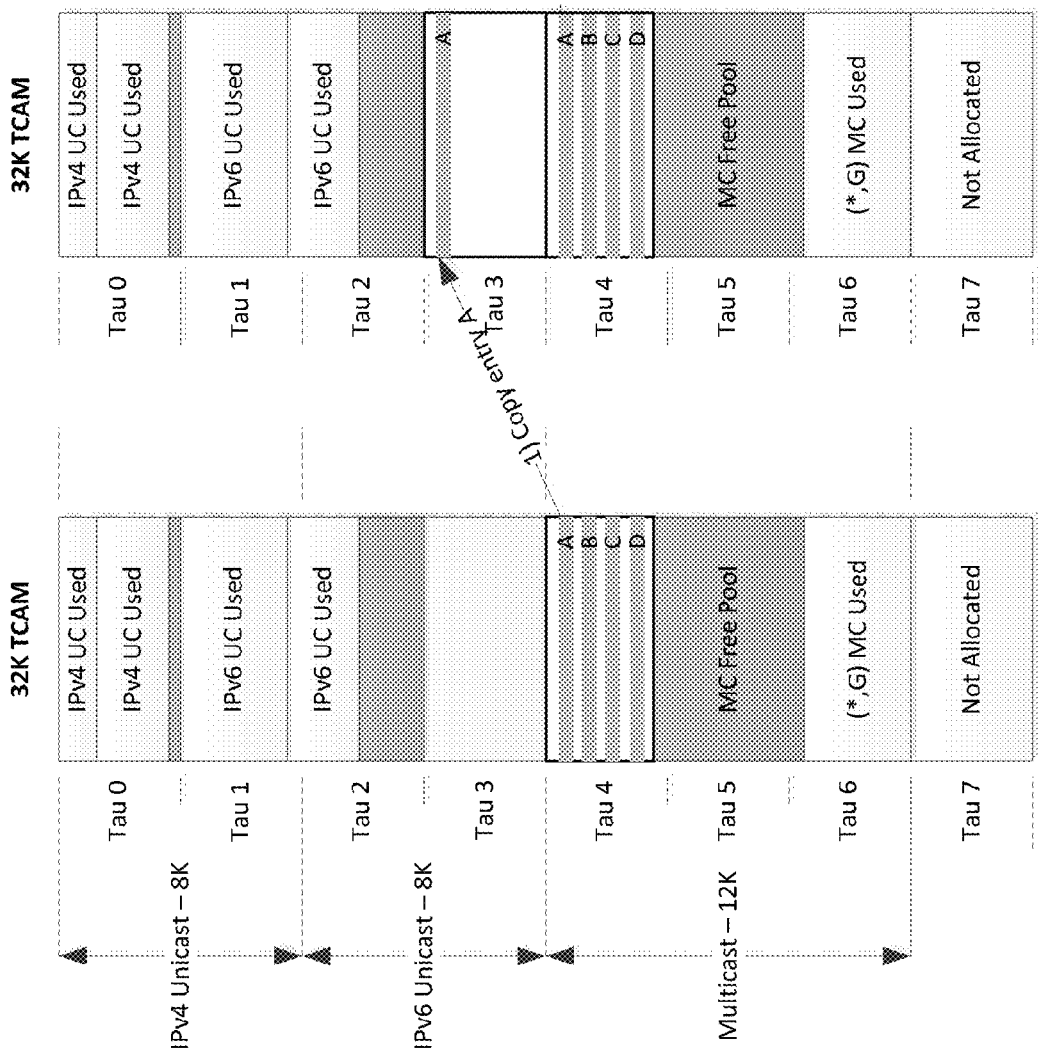
FIGS. 7A-D show an illustrative TCAM in different states as entries of data are relocated in the TCAM, according to some embodiments of the disclosure.
Figure 7B:
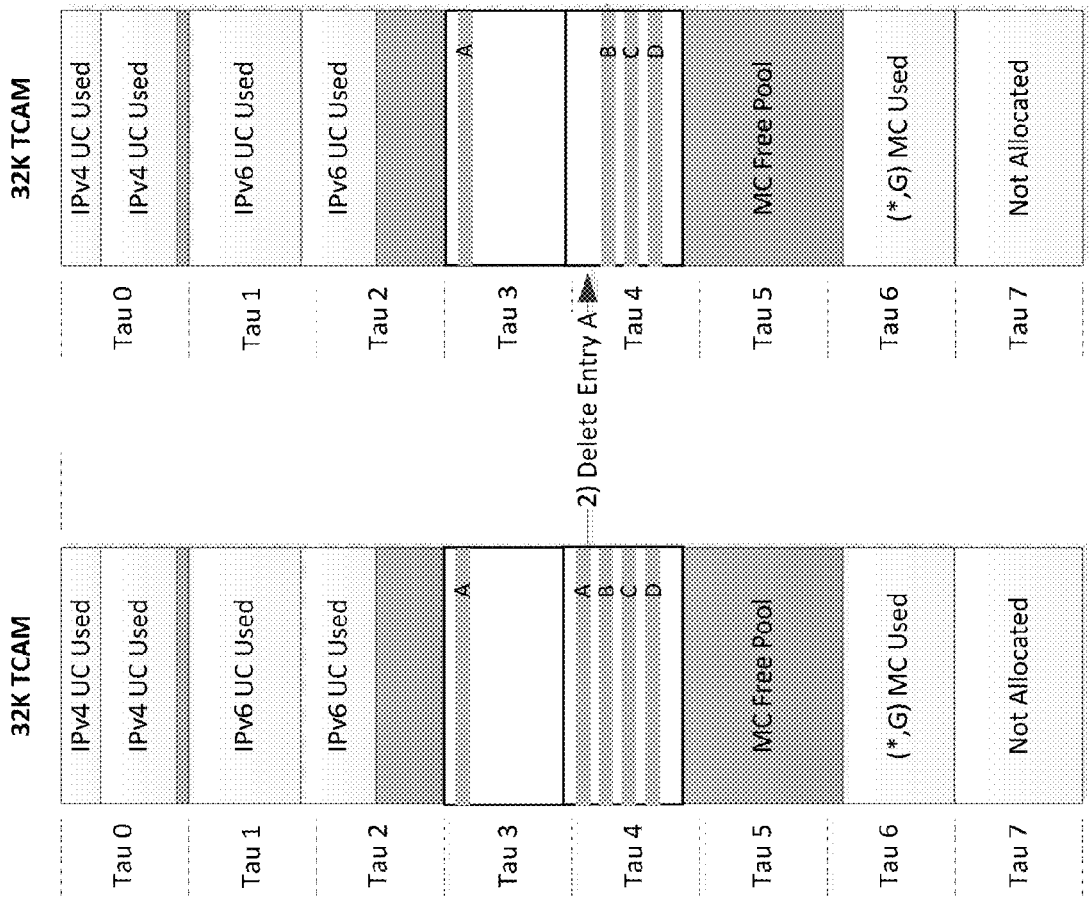
Figure 7C:
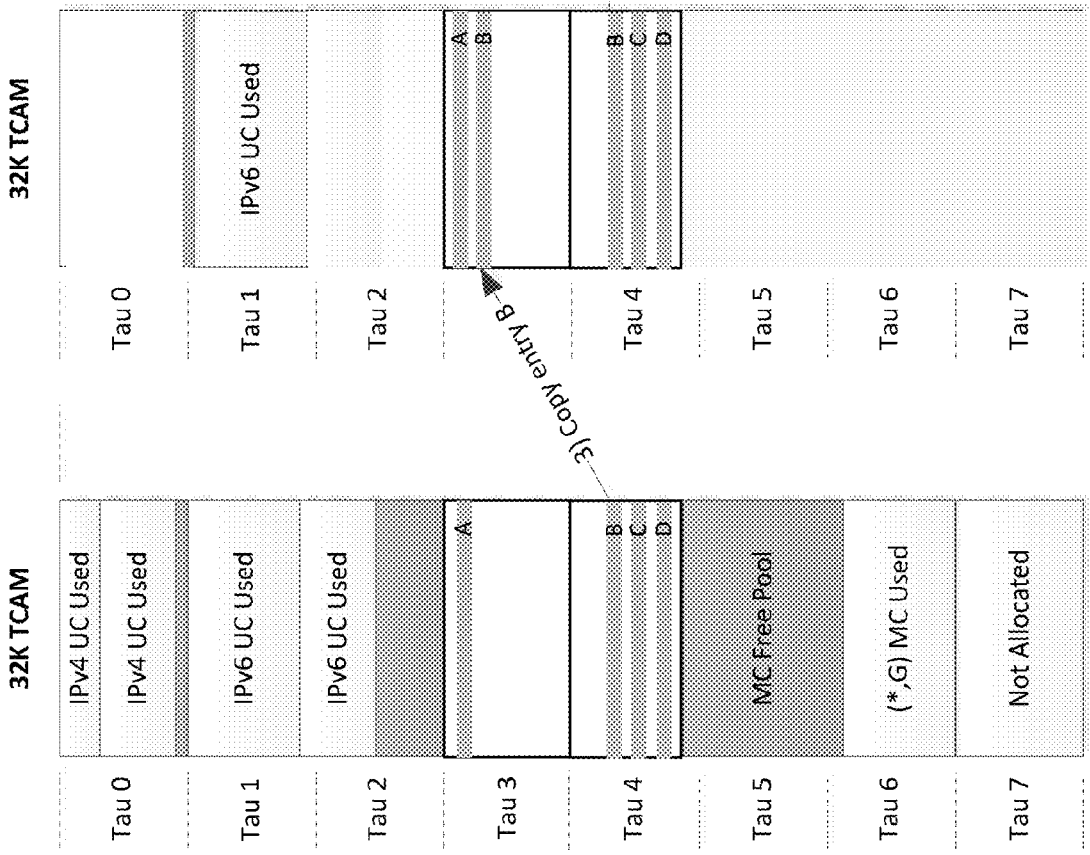
Figure 7D:
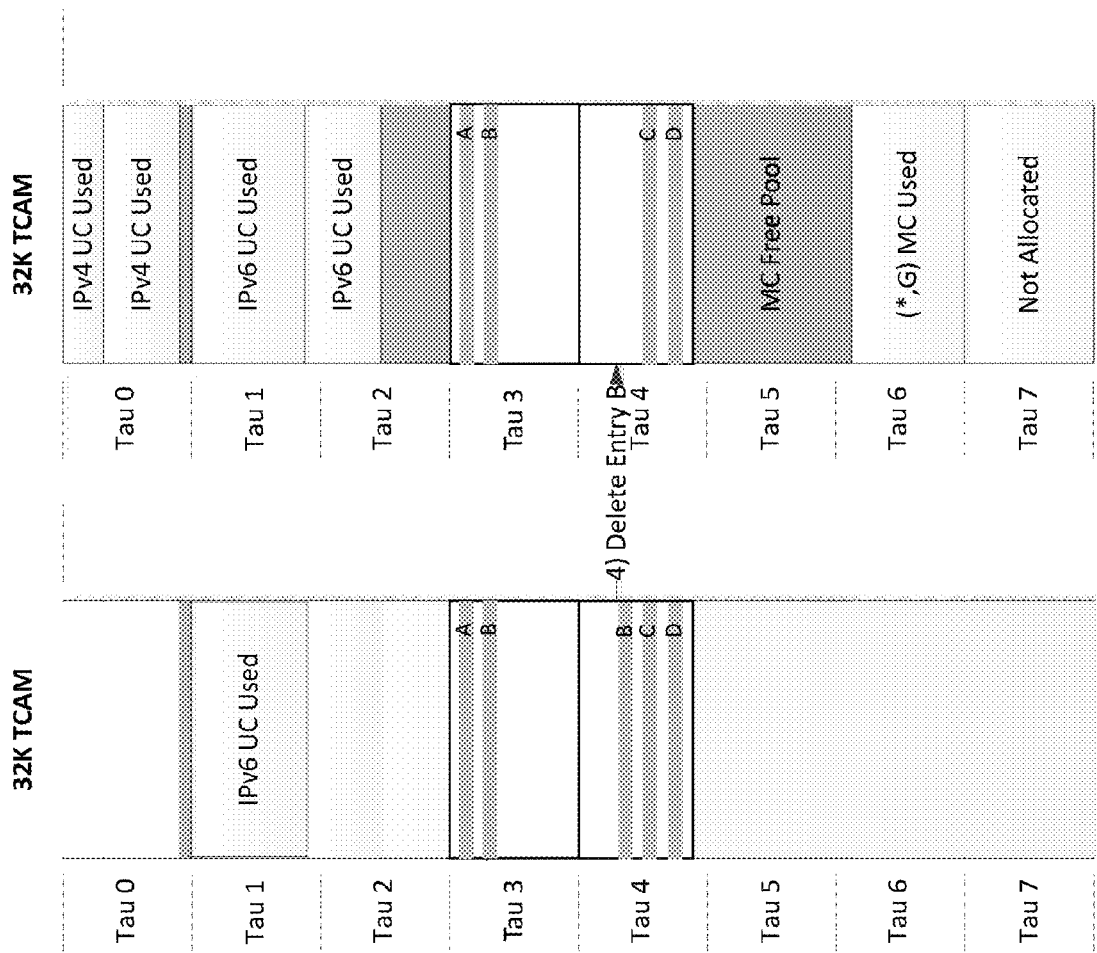

In this example shown in FIGS. 7A-B, the top used portion in Multicast forwarding mode of the original template is to be moved to TAU 3 in the intermediate template. In FIG. 7A, entry A is copied from an original location in TAU 4 to a new location in TAU 3. In other words, entry A now exists in the original location and at the new location. In FIG. 7B, entry A in the original location is deleted. Now, entry A only exists at the new location. In the states shown in FIGS. 7A-B, entry A exists in at least one location in the TCAM, and thus, entry A remains accessible. In FIG. 7C, entry B is copied from an original location in TAU 4 to a new location in TAU 3. In other words, entry B now exists in the original location and at the new location. In FIG. 7C, entry B at the original location is deleted. Now, entry B only exists at the new location. In the states shown in FIGS. 7C-D, entry B exists in at least one location in the TCAM, and thus, entry B remains accessible. The same mechanism applies to the rest of the entries.

Keeping the Ability to Learn New Entries During Relocation

In one (simpler) embodiment (such as the one shown in FIGS. 6A-B), the free portion (unused) TAU space of each forwarding mode is placed at the end of its reserved region of the intermediate template. The free pool portion is reduced to fit the partially unused TAU space. In a more enhanced implementation, the partially unused TAU space of each forwarding mode is placed in the middle of the two used pools (top used pool, and bottom used pool) of the forwarding mode of the intermediate template. That way the TCAM can continue to learn (populate) additional entries in the free pool portion while the system performs dynamic carving.

Figure 8:
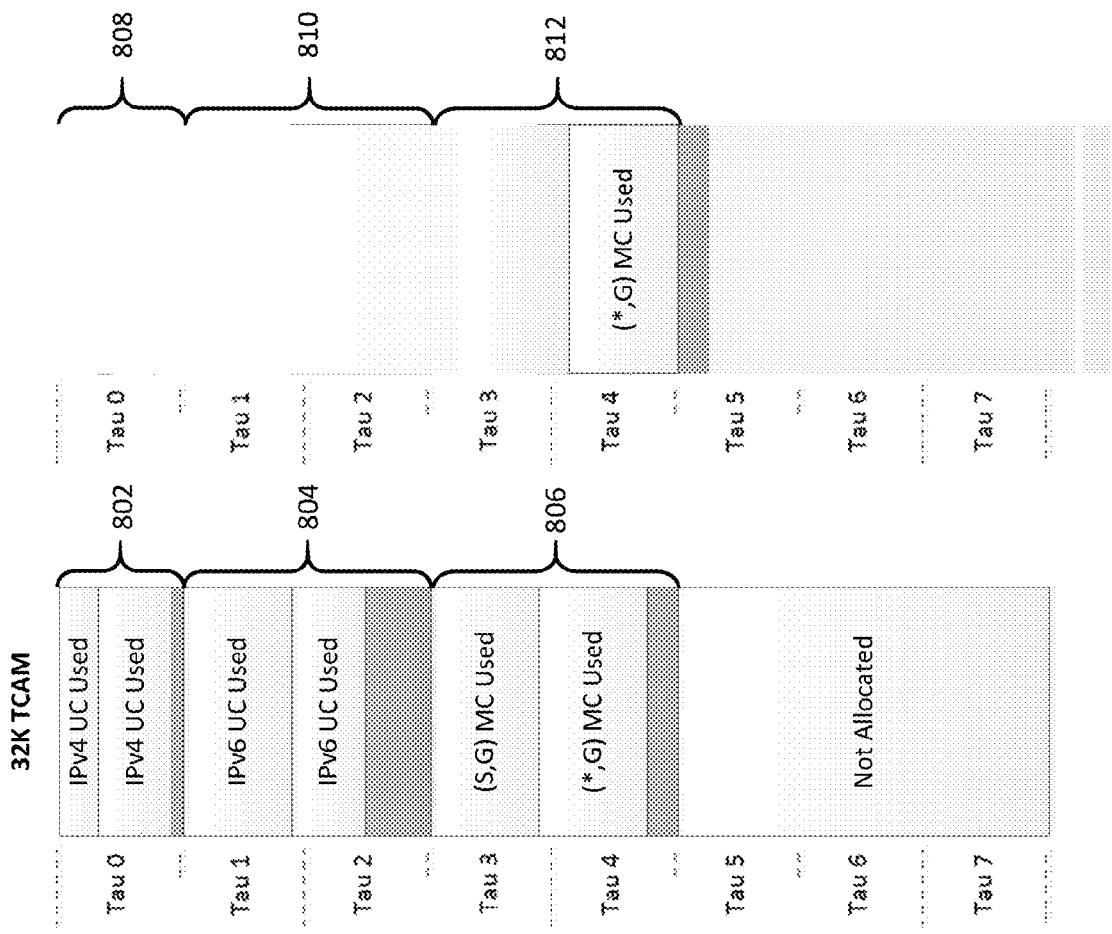
FIG. 8 shows different possible placements for the free pool portions in regions set by a minimum number of TAUs for the forwarding modes, according to some embodiments of the disclosure.

FIG. 8 shows different possible placements for the free pool portions in regions set by a minimum number of TAUs for the forwarding modes, according to some embodiments of the disclosure. The left side shows an arrangement for the intermediate template where the free pool portion of each region (e.g., region 802, region 804, and region 806) is placed at the end of its reserved region after the bottom used portion. In such an embodiment, requests to add new entries to the TCAM are rejected during dynamic carving. The right side shows an arrangement for the intermediate template where the free pool portion is placed between the top used pool and the bottom used pool within each region (e.g., region 808, region 810, and region 812). In other words, relocating the entries of data in the TCAM according to an intermediate template further comprises relocating the entries of data to a region set by the minimum number of TAUs for each of the forwarding modes while maintaining an intermediate free pool portion (comprising unused TCAM entries) between the first used portion and the second used portion in the region. In this manner, the TCAM can, during dynamic carving, learn one or more new entries of data for one or more forwarding modes by inserting the one or more new entries into the intermediate free pool portion even during the relocation of the entries of data according to the intermediate template and the relocation of the entries of data according to the revised template. In this alternative implementation, the method may compute the amount of space needed for the free pool portion in the compressed region to place the bottom used portion properly in the compressed region at the proper location.

Validation

Before the system proceed with data relocation, several checks can be applied to the revised template to make sure the revised template could be achieved. For instance, the method can further include receiving information for the revised template from a user via a user interface (or from another module in the network switch), and validating the information for the revised template to ensure proper operation and results of the method. If the information for the revised template is invalid, user output can be provided via the user interface to indicate that the revised template is rejected. If the revised template is valid, the method can go ahead and implement dynamic carving. Once dynamic carving is complete, the user can be notified of its completion.

Validation can check for one or more properties of the revised template. In one example, the revised template should have enough space to retain all used entries in TCAM. In another example, the total space of all the forwarding categories in the revised template must not be greater than TCAM memory size.

Here are some sample scenarios where the revised template can be rejected during validation. If the revised template (when compared to the original template) reduces the space allocated for a forwarding category while the size of used portions of that category is greater than the new allocated space, the request would be rejected. Reject for the reason that the new reserved space of the category is not enough to hold all current entries in the category. For the similar reason if the new request is interested in removing a forwarding category while the category has one or more existing entries, the request would be rejected.

Variations and Implementations

The dynamic carving of TCAM memory mechanism are described herein in relation to TCAM memories. However, the same mechanism can be applied to Content Addressable Memories (CAMs) in general. Specifically, the mechanism can be applied to dynamically implement a revised template on the CAM without rebooting the system. CAM is a special type of memory used by network switches as well. Rather than providing three results, CAM is simpler and provides only two results: 0 (true) or 1 (false). For example, CAM is most useful for building tables that search on exact matches such as MAC address tables. The CAM table is the primary table used to make Layer 2 forwarding decisions. In the case of Layer 2 switching tables, the switch must find an exact match to a destination MAC address or the switch floods the packet out all ports in the VLAN.

Note that the above "compression" and "decompression" steps described above illustrates only some typical scenarios where the method performs steps associated with relocation of entries and/or usage of the unallocated TAU(s) when going from the intermediate template to the revised template. For some special scenarios, the method may not always relocate entries at each step, and/or use the unallocated TAU(s) when going from the intermediate template to the revised template. The present disclosure and the claims do not intend to limit the scope to just these typical scenarios explicitly mentioned. Even though the above steps do not mention all of the possible/reasonable scenarios for dynamic carving (i.e., both typical and special scenarios), it is envisioned that the present disclosure and the claims would cover implementations where relocation of entries and/or usage of unallocated TAU(s) are performed on an "as-needed" basis to support both the typical and special scenarios. The following describes examples of these special scenarios.

While the method mentions relocating entries for "compression" (e.g., box 502 of FIG. 5), it is envisioned that in some special scenarios, entries are not relocated. For instance, if an original template includes one or more forwarding modes which are already using the least number of TAUs, the "compression" step may not include (any) relocation of entries. This is especially true if the implementation provides for having the free pool portion between the top and bottom used portions, no relocation of entries are needed in the "compression" step, since the original template already implements the intermediate template. Effectively, the entries of data are already "relocated" (or arranged) according to the intermediate template in this "compression" step, where the intermediate template is the same as the original template.

While the method mentions relocating entries for "decompression" (e.g., box 504 of FIG. 5), it is envisioned that in some special scenarios, entries are not relocated and/or the unallocated TAU(s) of the intermediate template are not utilized when going from the intermediate template to the revised template. In one instance, if the revised template specifies a mapping of each forwarding mode to a least number of TAU(s) needed for the forwarding modes, the intermediate template can be identical as the revised template, where the compression of relocating entries to an intermediate template would already result in the entries already arranged according to the revised template (especially if the implementation provides for the free pool portion between the top and bottom used portions in the intermediate template). In another instance, if the revised template adds a forwarding mode (but leaves the number of TAU(s) allocated to each forwarding mode the same), the entries are could also not be relocated when transitioning from the intermediate template to the revised template (and most likely not be relocated when transitioning from the original template to the intermediate template neither). In yet another instance, if the revised template adds a forwarding mode and specifies a mapping of each forwarding mode to a least number of TAU(s) needed for the forwarding modes, the compression of relocating entries to an intermediate template and the addition of the new forwarding mode could already result in relocating the entries according to the revised template.

The method for dynamic carving of TCAM memory can be used in scenarios having one or more of the following properties: (1) the revised template has one or more forwarding modes which increase the number of TAU(s) allocated, (2) the revised template has one or more forwarding modes which decrease the number of TAU(s) allocated, (3) the revised template removes one or more forwarding modes, (4) the revised template adds one or more forwarding modes. Furthermore the method can be performed by any suitable apparatuses (not just network switches) having to apply revised templates for a TCAM.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the dynamic carving operations thereof. This may be inclusive of appropriate algorithms and communication protocols that allow for the effective exchange of data or information.

In one implementation, network switches (e.g., having routing modules and dynamic carving modules) described herein may include software to achieve (or to foster) the functions discussed herein for dynamic carving where the software is executed on one or more processors to carry out the functions. This could include the implementation of instances of routing modules, dynamic carving modules and/or any other suitable element that would foster the activities discussed herein. Additionally, each of these elements can have an internal structure (e.g., a processor, a memory element, etc.) to facilitate some of the operations described herein. In other embodiments, these functions for dynamic carving may be executed externally to these elements, or included in some other network element to achieve the intended functionality. Alternatively, network switches may include software (or reciprocating software) that can coordinate with other network elements in order to achieve the dynamic carving functions described herein. In still other embodiments, one or several devices may include any suitable algorithms, hardware, software, components, modules, interfaces, or objects that facilitate the operations thereof.

In certain example implementations, the dynamic carving functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the dynamic carving activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the dynamic carving functions, as outlined herein. Additionally, each of these devices may include a processor that can execute software or an algorithm to perform the dynamic carving activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of dynamic carving, as potentially applied to a myriad of other architectures.

It is also important to note that the steps in the FIG. 5 illustrate only some of the possible scenarios that may be executed by, or within, the network switches described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the network switches in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not necessarily intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for applying a revised template for ternary content addressable memory (TCAM) in a network switch, the TCAM comprising a plurality of TCAM allocation units (TAUs), entries of data in the TCAM corresponding to forwarding modes are arranged according to an original template mapping each forwarding mode to a subset of TAU(s), wherein the method comprises:
    relocating the entries of data in the TCAM according to an intermediate template, wherein the intermediate template comprises at least one unallocated TAU(s) for accommodating the revised template; and
    after the entries of data are relocated according to the intermediate template, relocating the entries of data in the TCAM according to the revised template.

2. The method of claim 1, wherein the relocating of the entries of data according to the intermediate template and the relocating of the entries of data according to the revised template are performed without rebooting the network switch.

3. The method of claim 1, wherein the relocating of the entries of data according to the intermediate template and the relocating of the entries of data according to the revised template are performed while the entries of data in the TCAM remain accessible by circuitry external to the TCAM.

4. The method of claim 1, wherein:
    relocating the entries of data in the TCAM according to the intermediate template and relocating the entries of data in the TCAM according to the revised template comprises relocating a particular entry of data, among the entries of data, from a first location in the TCAM to a second location in the TCAM; and
    relocating the particular entry of data includes:
        copying the particular entry of data stored at the first location to the second location; and
        after the particular entry of data is copied to the second location, deleting the particular entry of data at the first location.

5. The method of claim 1, wherein:
    the original template maps each forwarding mode to a subset of TAUs in the TCAM;
    each forwarding mode has, in the corresponding subset of TAUs, a first used portion, a free pool portion, and a second used portion; and
    the free pool portion, comprising unused TCAM entries, and is arranged between the first used portion and the second used portion.

6. The method of claim 1, wherein relocating entries of data in the TCAM according to an intermediate template comprises:
    for the at least one of the forwarding modes where the number of TAUs is reduced in the intermediate template, rearranging entries of data for the at least one forwarding mode to reduce the size of a free pool portion for the at least one of the forwarding modes in the intermediate template.

7. The method of claim 1, wherein relocating the entries of data in the TCAM according to the intermediate template comprises:
    determining a minimum number of TAUs required by a first used portion and a second used portion for each of the forwarding modes; and
    providing the intermediate template by mapping the minimum number of TAUs from the determining step to each of the forwarding modes.

8. The method of claim 1, wherein relocating the entries of data in the TCAM according to the intermediate template further comprises:
    relocating the entries of data to a region set by a minimum number of TAUs for each of the forwarding modes while maintaining an intermediate free pool portion comprising unused TCAM entries between a first used portion and a second used portion in the region.

9. The method of claim 8, further comprising:
    learning one or more new entries of data for one or more forwarding modes by inserting the one or more new entries into the intermediate free pool portion even during the relocation of the entries of data according to the intermediate template and the relocation of the entries of data according to the revised template.

10. The method of claim 1, wherein:
    a free pool portion, comprising unused TCAM entries, for a particular forwarding mode, when the entries of data is arranged according to the intermediate template, is placed at an end of a region, after a first used portion and a second used portion of the particular forwarding mode, wherein the region is set by a minimum number of TAU(s) mapped to the particular forwarding mode in the intermediate template.

11. The method of claim 1, wherein the one or more unallocated TAUs allow the relocation of the entries of data according to the revised template.

12. The method of claim 1, wherein the original template includes a first set of forwarding modes and the revised template includes of a second set of forwarding modes different from the first set of forwarding modes.

13. The method of claim 1, wherein the revised template differs from the original template where a number of TAUs mapped to at least one of the forwarding modes is different between the revised template and the original template.

14. An apparatus for applying a revised template for ternary content addressable memory (TCAM) in a network switch, the TCAM comprising a plurality of TCAM allocation units (TAUs), entries of data in the TCAM corresponding to forwarding modes are arranged according to an original template mapping each forwarding mode to a subset of TAU(s), wherein the apparatus comprises:
　at least one memory element;
　at least one processor coupled to the at least one memory element; and
　a dynamic carving module that when executed by the at least one processor is configured to:
　　relocating the entries of data in the TCAM according to an intermediate template, wherein the intermediate template comprises at least one unallocated TAU(s) for accommodating the revised template; and
　　after the entries of data are relocated according to the intermediate template, relocating the entries of data in the TCAM according to the revised template.

15. The apparatus of claim 14, wherein the relocating of the entries of data according to the intermediate template and the relocating of the entries of data according to the revised template are performed by the dynamic carving module without rebooting the network switch.

16. The apparatus of claim 14, wherein the relocating of the entries of data according to the intermediate template and the relocating of the entries of data according to the revised template are performed while the entries of data in the TCAM remain accessible by circuitry external to the TCAM.

17. The apparatus of claim 14, wherein:
　relocating the entries of data in the TCAM according to the intermediate template and relocating the entries of data in the TCAM according to the revised template comprises relocating a particular entry of data, among the entries of data, from a first location in the TCAM to a second location in the TCAM; and
　relocating the particular entry of data includes:
　　copying the particular entry of data stored at the first location to the second location; and
　　after the particular entry of data is copied to the second location, deleting the particular entry of data at the first location.

18. A computer-readable non-transitory medium comprising one or more instructions, for applying a revised template for ternary content addressable memory (TCAM) in a network switch, the TCAM comprising a plurality of TCAM allocation units (TAUs), entries of data in the TCAM corresponding to forwarding modes are arranged according to an original template mapping each forwarding mode to a subset of TAU(s), that when executed on a processor configure the processor to perform one or more operations comprising:
　relocating the entries of data in the TCAM according to an intermediate template, wherein the intermediate template comprises at least one unallocated TAU(s) for accommodating the revised template; and
　after the entries of data are relocated according to the intermediate template, relocating the entries of data in the TCAM according to the revised template.

19. The computer-readable non-transitory medium of claim 18, wherein relocating the entries of data in the TCAM according to the intermediate template comprises:
　determining a minimum number of TAUs required by a first used portion and a second used portion for each of the forwarding modes; and
　providing the intermediate template by mapping the minimum number of TAUs from the determining step to each of the forwarding modes.

20. The computer-readable non-transitory medium of claim 18, wherein relocating the entries of data in the TCAM according to the intermediate template further comprises:
　relocating the entries of data to a region set by a minimum number of TAUs for each of the forwarding modes while maintaining an intermediate free pool portion comprising unused TCAM entries between a first used portion and a second used portion in the region.

\* \* \* \* \*